(No Model.)

J. H. ROBERTSON.
ELECTRIC TELEPHONE TRANSMITTER.

No. 276,632. Patented May 1, 1883.

Witnesses:
Henry Eichling
A.G.N. Vermilye

Inventor:
James H. Robertson
by J. F. Lieb
his Atty.

UNITED STATES PATENT OFFICE.

JAMES H. ROBERTSON, OF BROOKLYN, NEW YORK.

ELECTRIC TELEPHONE-TRANSMITTER.

SPECIFICATION forming part of Letters Patent No. 276,632, dated May 1, 1883.

Application filed August 21, 1882. (No model.)

*To all whom it may concern:*

Be it known that I, JAMES H. ROBERTSON, of the city of Brooklyn, in the county of Kings and State of New York, have invented a new and useful Improvement in Electric Telephone-Transmitters, of which the following is a specification, reference being had to the accompanying drawings, forming part of the same.

My invention relates to that class of electric telephone-transmitters in which the electric current passes through electrodes that are loosely in contact.

In the class of telephone-transmitters above referred to, as is well known, a vibrative diaphragm is employed whose vibrations under the impulses of the sound-waves affect the electric current so as to produce corresponding vibrations of a diaphragm in the receiver. At the center of the transmitter-diaphragm is fixed an electrode, in contact with which is arranged a free electrode. My present invention relates to the connection of this fixed electrode with the diaphragm. The usual mode of fastening said electrode to the diaphragm is by a rigid connection—as, for example, a metal pin or stud riveted to the center, or a piece of carbon rigidly attached thereto.

My improvement consists in placing the electrode loosely in contact with the diaphragm and retaining it in place by an elastic connection, which will permit a variation of pressure between the electrode and the diaphragm at the point of contact under the vibrations of the diaphragm.

Figure 1:
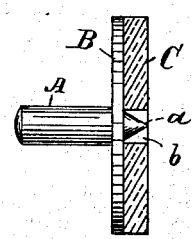
Figure 2:
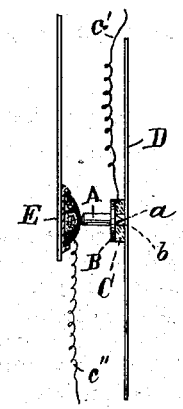
Figure 3:
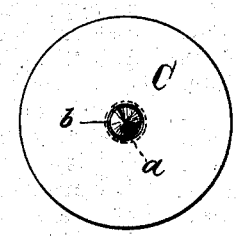

Figure 1 is a side view of my electrode, showing an edge view of a collar or flange on the same, and a section of an elastic disk intended to be interposed between the said collar and the diaphragm, to which the electrode is to be attached. Fig. 2 is a similar view of the same on a smaller scale, attached to the diaphragm, and also an edge view of the free electrode; and Fig. 3 is a face view of the said elastic disk and the end of the electrode.

A is the electrode, consisting of a stud or pin, of carbon or other suitable substance, having a pointed end $a$.

B is a flange on said pin.

C is a rubber disk with a hole, $b$, through its center. The disk is placed and secured preferably by cement upon the inner face of the flange B. The point $a$ of the pin A projects from the inner face of the flange B through the hole $b$ a distance just equal to the thickness of the disk. The electrode thus constructed is then placed on the center of the diaphragm D, and there secured by cementing the disk C to it. It is evident that with this arrangement the point $a$ will just touch the face of the diaphragm with a loose contact, and that the elasticity of the disk C will permit of varying pressure between the point and the diaphragm as the latter is vibrated.

I have not deemed it necessary to represent by drawings or describe the case or mouth-piece of the common telephone, as all skilled in the art are familiar with them. It will be understood of course that the diaphragm is to be properly supported and held in place. E will be recognized as the free electrode in contact with the electrode A, and $c'$ $c''$ as the circuit-wires connected severally with said electrodes.

What I claim, and desire to secure by Letters Patent, is—

The combination of the diaphragm D, the described electrode, consisting of the flange B, the post A, provided with the point $a$, projecting from the said flange, and the elastic disk C, interposed between said diaphragm and flange and attached to both, and through an opening in which the said point extends, as and for the purpose described.

JAMES H. ROBERTSON.

In presence of—
P. B. VERMILYA,
A. G. N. VERMILYA.